(12) United States Patent
Davis et al.

(10) Patent No.: US 11,169,766 B2
(45) Date of Patent: Nov. 9, 2021

(54) PRESSURE COMPENSATION IN DISPLAY SOUND DEVICE

(71) Applicant: QUALCOMM Incorporated, San Diego, CA (US)

(72) Inventors: Graham Bradley Davis, Del Mar, CA (US); Ricardo De Jesus Bernal Castillo, San Diego, CA (US); Rivanaldo Sergio De Oliveira, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 115 days.

(21) Appl. No.: 16/586,845

(22) Filed: Sep. 27, 2019

(65) Prior Publication Data

US 2021/0004199 A1    Jan. 7, 2021

Related U.S. Application Data

(60) Provisional application No. 62/869,729, filed on Jul. 2, 2019.

(51) Int. Cl.
*G06F 3/16* (2006.01)
*H04R 3/00* (2006.01)

(52) U.S. Cl.
CPC ............... *G06F 3/165* (2013.01); *H04R 3/00* (2013.01); *H04R 2400/03* (2013.01); *H04R 2499/11* (2013.01); *H04R 2499/15* (2013.01)

(58) Field of Classification Search
CPC ....... G06F 3/165; H04R 3/00; H04R 2400/03; H04R 2499/11; H04R 2499/15
See application file for complete search history.

(56) References Cited

U.S. PATENT DOCUMENTS

| | | | |
|---|---|---|---|
| 2014/0369512 A1* | 12/2014 | Slupeiks | H04R 3/00 381/59 |
| 2020/0107113 A1* | 4/2020 | Hou | G01L 19/02 |
| 2020/0275222 A1* | 8/2020 | Bernal Castillo | G10K 11/17883 |
| 2021/0004199 A1* | 1/2021 | Davis | H04R 3/04 |

* cited by examiner

*Primary Examiner* — David L Ton
(74) *Attorney, Agent, or Firm* — Moore IP

(57) ABSTRACT

A device to process an audio signal representing output sound includes one or more processors configured to generate, responsive to sensor data indicative of pressure detected at a housing of the device, output data based on a predicted effect of the pressure on an acoustic output of the device. The one or more processors are also configured, responsive to the output data, to adjust operation of an audio playback component that generates the acoustic output.

30 Claims, 8 Drawing Sheets

PRESSURE COMPENSATION IN DISPLAY SOUND DEVICE

I. CROSS-REFERENCE TO RELATED APPLICATIONS

The present application claims priority from U.S. Provisional Patent Application No. 62/869,729, filed Jul. 2, 2019, entitled "PRESSURE COMPENSATION IN DISPLAY SOUND DEVICE," which is incorporated by reference in its entirety.

II. FIELD

The present disclosure is generally related to display sound devices and more specifically, to audio compensation for pressure applied to a display sound device.

III. DESCRIPTION OF RELATED ART

Phone manufactures have recently introduced "display sound" phones in which the phone's display screen is vibrated by a transducer so that the display screen functions as a loudspeaker. Using the display as a speaker allows a phone manufacturer to omit an earpiece speaker, enabling use of a smaller bezel and a larger display as compared to phones that include an earpiece speaker. However, generating high-quality sound reproduction that is satisfactory for telephony and for audio playback, such as a playing a high-definition movie, using the display as a speaker has proven challenging.

IV. SUMMARY

According to one implementation of the present disclosure, a device to process an audio signal representing output sound includes one or more processors configured to generate, responsive to sensor data indicative of pressure detected at a housing of the device, output data based on a predicted effect of the pressure on an acoustic output of the device. The one or more processors are also configured to, responsive to the output data, adjust operation of an audio playback component that generates the acoustic output.

According to another aspect of the present disclosure, a method of processing an audio signal representing output sound includes generating, responsive to sensor data indicative of pressure detected at a housing of a device, output data based on a predicted effect of the pressure on an acoustic output of the device. The method also includes, responsive to the output data, adjusting operation of an audio playback component that generates the acoustic output.

According to another aspect of the present disclosure, a non-transitory computer-readable medium includes instructions that, when executed by one or more processors of a device, cause the one or more processors to generate, responsive to sensor data indicative of pressure detected at a housing of the device, output data based on a predicted effect of the pressure on an acoustic output of the device. The instructions, when executed by the one or more processors, also cause the one or more processors to, responsive to the output data, cause an adjustment of operation of an audio playback component that generates the acoustic output.

According to another aspect of the present disclosure, an apparatus to process an audio signal representing output sound includes means for generating, responsive to sensor data indicative of pressure detected at a housing of a device, output data based on a predicted effect of the pressure on an acoustic output of the device. The apparatus also includes means for adjusting operation, responsive to the output data, of an audio playback component that generates the acoustic output.

V. BRIEF DESCRIPTION OF THE DRAWINGS

VI. DETAILED DESCRIPTION

Figure 1:
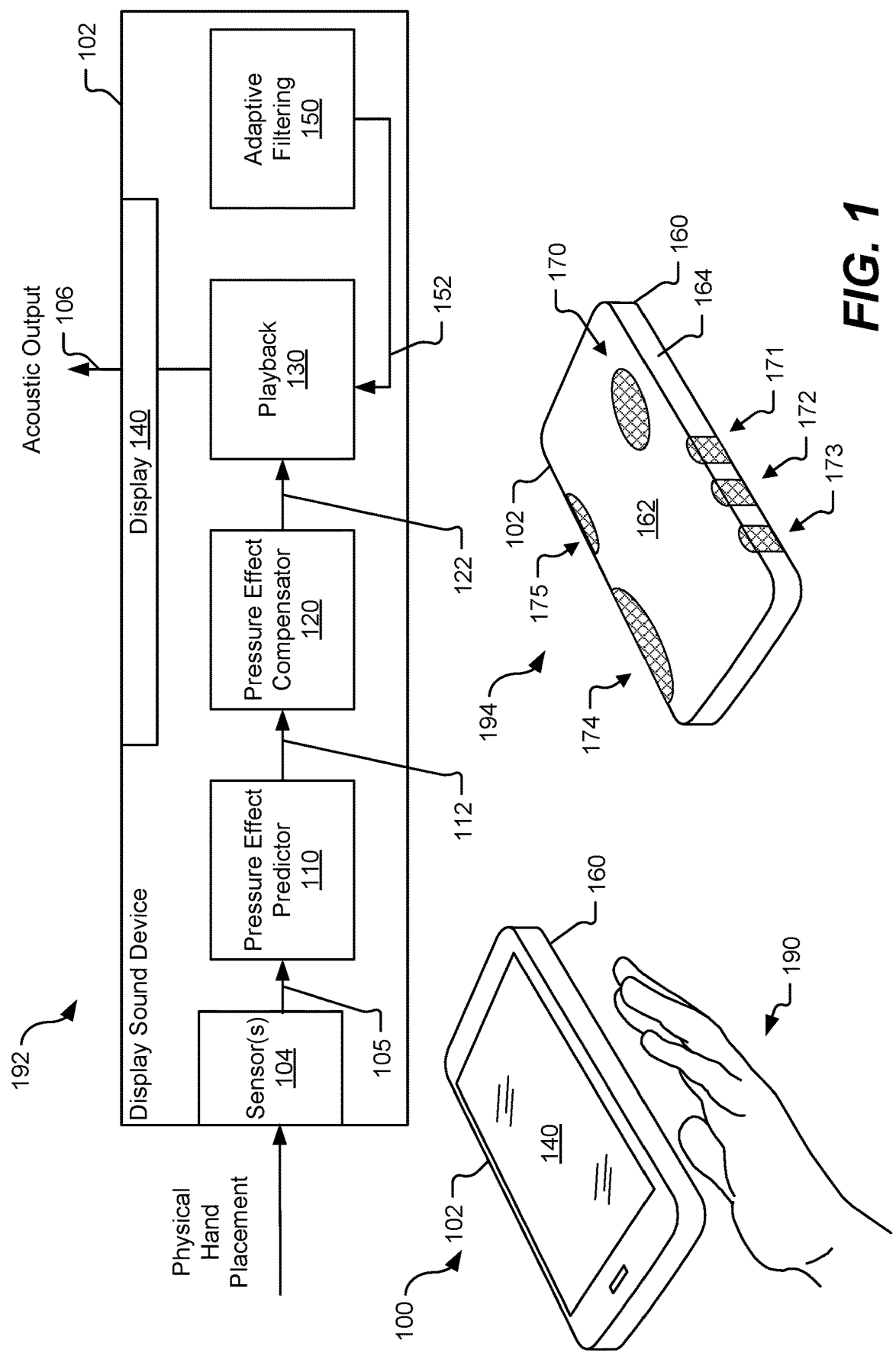
FIG. 1 is a diagram of a particular illustrative implementation of a system including a display sound device operable to perform pressure compensation.

Devices and methods are described that compensate for pressure on a display sound device. Although display sound phones enable use of a smaller bezel and a larger display as compared to phones that include an earpiece speaker, generating consistently high-quality sound has proven challenging. In particular, pressure applied to the back (or sides) of a display sound phone affects the audio playback quality of the phone. As a non-limiting example, a low-frequency response of a conventional display sound phone changes due to vibration dampening based on the presence and location on the backplate of the phone of a finger, palm, mount support, or any other structure applying pressure to the backplate.

Compensation for audio playback effects due to externally applied pressure are achieved by adaptively adjusting audio playback based on pressure detected on a housing of a display sound device. For example, sensors (e.g., force or pressure sensors) can be embedded in a backplate of the display sound device and the resulting sensor data can be used to estimate a user's hand placement. An equalization filter may be determined based on the estimate of the user's hand placement and applied to an audio playback signal to reduce or eliminate an effect of the user's hand on the acoustic response of the display sound device. As another example, one or more transducer drive signals may be adjusted to reduce or eliminate an effect of the user's hand on the acoustic response of the display sound device. In some implementations, an adaptive filter is implemented to provide further compensation based on a feedback signal from audio playback. By adaptively adjusting audio playback based on pressure detected on a housing of a display sound device, variation of the acoustic response of the display sound device due to the externally applied pressure can be reduce or eliminated, providing a user of the device with a consistent audio playback quality that is substantially independent of how the user holds or otherwise supports the display sound device.

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearby wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more."

The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include smart speakers, speaker bars, cellular phones, personal digital assistants (PDAs), handheld devices, headsets, wearable devices, wireless modems, laptop computers, personal computers, etc.

FIG. 1 depicts a system 100 that includes a display sound device 102 that is configured to generate output sound by vibrating a display 140. The display sound device 102 is configured to process an audio signal representing the output sound to compensate for an effect of pressure applied to a housing 160 of the device 102, such as by a hand 190 holding the device 102. In some implementations, the device 102 can include a portable communication device (e.g., a "smart phone"), a wearable device (e.g., a "smart watch"), a vehicle system (e.g., a movable or removable display for use with an automobile entertainment system, navigation system, or self-driving control system), or a virtual reality or augmented reality headset, as illustrative, non-limiting examples.

A block diagram 192 illustrates components of the device 102, including one or more sensors 104, a pressure effect predictor 110, a pressure effect compensator 120, an audio playback component 130, an adaptive filtering unit 150, and the display 140. The audio playback component 130 is configured to vibrate the display 140 to generate an acoustic output 106, such as by controlling a transducer, such as a mechanical transducer, that is mechanically coupled to the display 140. Because pressure on the housing 160 can affect a frequency response of the device 102, such as by dampening of backplate propagation or leakage of vibration through the backplate 162, the device 102 is configured to detect and compensate for such pressure to reduce or eliminate distortion of the acoustic output 106.

A perspective view 194 illustrates an example of pressure points on the backplate 162 and a sidewall 164 of the housing 160, including a contact region 170 of an first finger, a contact region 171 of a second finger, a contact region 172 of a third finger, a contract region 173 of a fourth finger, a contact region 174 of a palm, and a contact region 175 of a thumb. Because different users with different hand sizes, left-hand or right-hand preferences, preferred orientations (e.g., landscape mode for video consumption, portrait mode for audio or video telecommunication), or other preferences can result in different contact region patterns and differing amounts of pressure applied to the housing 160, the contact region pattern 170-175 is depicted for purposes of illustration only and should not be considered limiting.

The sensor(s) 104 are coupled to the housing 160 and configured to detect one or more locations of contact with the backplate 162, one or more sides of the housing 160 (e.g., the side 164), or a combination thereof. For example, the sensor(s) 104 can include one or more pressure sensors, capacitive sensors, deformation sensors, optical sensors, infrared sensors, or any combination thereof, as illustrative, non-limiting examples. The sensor(s) 104 may be embedded in a surface of the housing 160 and may be substantially or entirely imperceptible to a user if the device 102. In some implementations, the sensor(s) 104 are arranged in a regular pattern to provide substantially equal detection capability at all portions of the backplate 162, one or more sides, or a combination thereof. In other implementations, the sensor(s) 104 are arranged to provide higher accuracy detection capability at specific portions of the backplate 162, at specific portions of one or more sides of the housing 160, or a combination thereof, that are determined to be likely points of contact based on statistical data indicative of a large population of users holding the device 102. In some implementations, relatively few (or none) of the sensor(s) 104 are configured to detect contact with the sides of the housing 160, providing reduced cost and complexity. To illustrate, in some implementations, effects on the acoustic response of the device 102 due to pressure on the sidewalls of the housing 160 are relatively small as compared to the effects on the acoustic response due to pressure on the backplate 162.

The pressure effect predictor 110 is configured to receive information indicative of pressure detected at the housing 160 of the device 102, such as sensor data 105 from the sensor(s) 104 indicating a physical hand placement on the device 102. The pressure effect predictor 110 is configured to generate output data 112 responsive to the sensor data 105 and based on a predicted effect of the pressure on an acoustic output of the device 102. For example, in some implementations the pressure effect predictor 110 includes a classifier (e.g., in an implementation that includes neural network or machine learning to train the classifier to generate the output data 112 responsive to the sensor data 105), a look-up table, a filter (such as a Kalman filter), or any combination thereof.

In some implementations, the output data 112 includes a parametric output indicating how many points of contact are detected and where the detected points of contact are located. In one example, the output data 112 includes coordinates (e.g., a grid location, a centroid and area, a boundary, or other coordinate type) of detected points of contact on a surface of the housing 160. In another example, the output data 112 indicates one of a predefined set of contact patterns that represents a best fit to the sensor data 105 as compared to the other predefined contact patterns. Alternatively, or in addition, the output data 112 indicates a predicted variation or effect of the acoustic response of the device 102 based on a contact pattern represented by the sensor data 105.

The pressure effect compensator 120 is responsive to the output data 112 to adjust operation of the audio playback component 130 that generates the acoustic output 106 via vibrating the display 140. To illustrate, a compensator output 122 is generated that causes the audio playback component 130 to adjust one or more gains, phases, frequency band attenuation or amplification, or any combination thereof, to at least partially offset, or compensate for, the predicted variation or effect of the acoustic response of the device 102. In some implementations, the pressure effect compensator 120 outputs a drive signal to a single mechanical transducer, as described with reference to FIG. 2, or outputs multiple drive signals to multiple mechanical transducers, as described with reference to FIG. 3.

The adaptive filtering unit 150 is configured to receive a feedback signal and to generate an adjustment signal 152 to further to adjust operation of the audio playback component 130. In some implementations, such as described further with reference to FIGS. 2-3, the adaptive filtering unit 150 is configured to receive the feedback signal from one or more feedback microphones. In some implementations, the adaptive filtering unit 150 is configured to generate the adjustment signal 152 based on a measured acoustic response of the device 102 and a target frequency response. For example, the target frequency response can correspond to an industry specification, such as a 3rd Generation Partnership Project (3GPP) specification regarding user equipment (UE) Receive Frequency Response (RFR).

In some implementations, the pressure effect predictor 110, the pressure effect compensator 120, or any combination thereof, are implemented using dedicated circuitry or hardware. In some implementations, the pressure effect predictor 110, the pressure effect compensator 120, or any combination thereof, are implemented via execution of firmware or software. To illustrate, the device 102 can include a memory configured to store instructions and one or more processors configured to execute the instructions to implement the pressure effect predictor 110 and the pressure effect compensator 120, such as described further with reference to FIGS. 2-3 and FIG. 9.

By adaptively adjusting audio playback based on pressure detected on the housing 160 of the device 102, variation of the acoustic response of the device 102 due to the externally applied pressure can be reduced or eliminated, providing a user of the device 102 with a consistent audio playback quality that is substantially independent of how the user holds or otherwise supports the device 102.

Although FIG. 1 describes detecting and compensating for acoustic response effects due to contact by the hand 190, it should be understood that the device 102 may detect and compensate for pressure or contact from any source. For example, the device 102 may be implemented in an electronic watch, virtual reality headset, or other wearable device that detects pressure against a wearer's wrist or face, respectively. As another example, the device 102 may be implemented with a phone case or a with "kickstand" to hold the device 102 substantially vertically, placed in a car phone holder, or used in conjunction with one or more other support mechanisms that place pressure on the backplate 162 or sides of the housing 160. In a specific example, the device 102 can be mounted on a handset positioner, with or without support pins, for purposes for Receive Frequency Response measurement.

Figure 2:
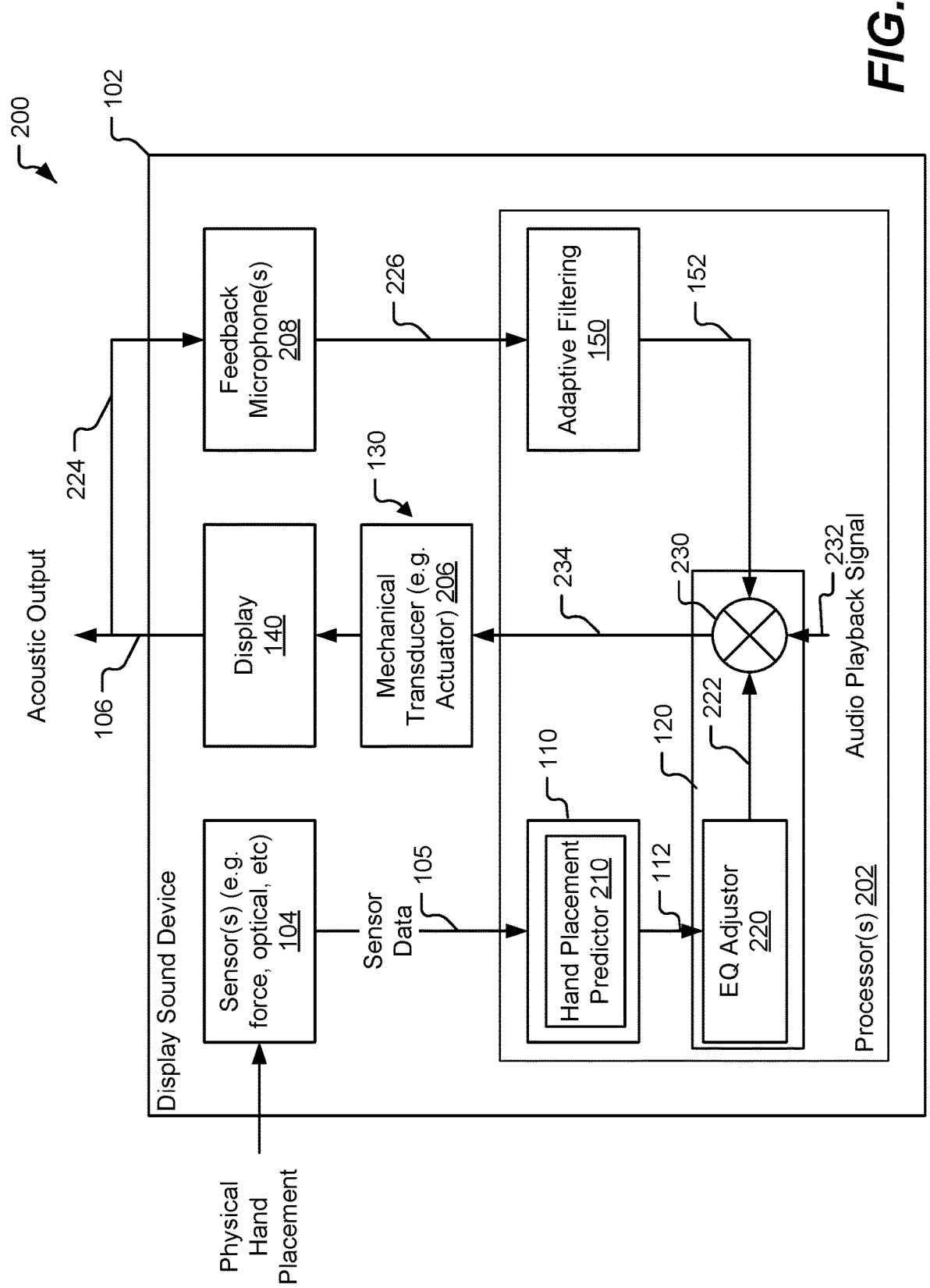
FIG. 2 is a diagram of a particular implementation of the device of FIG. 1.

FIG. 2 depicts a first implementation 200 showing further aspects of components that can be implemented in the device 102 of FIG. 1. As illustrated in FIG. 2, the audio playback component 130 includes a mechanical transducer 206, such as an actuator, that is configured to be coupled to the display 140. The mechanical transducer 206 is responsive to a drive signal 234 to generate at least a portion of the acoustic output 106 by vibrating the display 140.

The pressure effect predictor 110 includes a hand placement predictor 210 that is configured to match the sensor data 105 to one or more hand placement models or configurations, providing higher accuracy of pressure effects on acoustic response when the device 102 is held by a hand as compared to an accuracy of pressure effect estimation that is not specifically correlated to hand placement models or configuration.

The pressure effect compensator 120 includes an equalizer (EQ) adjustor 220 and a signal combiner 230. The equalizer adjustor 220 is configured to generate a compensation signal 222 (e.g., equalization filter settings or an index of a predetermined equalization filter) based on the output data 112. The signal combiner 230 (e.g., a multiplier) is configured to adjust an audio playback signal 232 based on the compensation signal 222 and based on the adjustment signal 152 from the adaptive filtering unit 150 to generate an adjusted audio playback signal. For example, audio playback signal 232 can correspond to audio data from an audio or video file, streaming audio or video data or telephonic audio data received by the device 102, or an audio soundtrack or audio effects corresponding to a gaming application executing at the device 102, as illustrative, non-limiting examples. The signal combiner 230 outputs the adjusted audio playback signal to the mechanical transducer 206 as the drive signal 234.

The adaptive filtering unit 150 receives a feedback signal 226 from one or more feedback microphones 208. In a particular implementation, the adaptive filtering unit 150 determines parameters of an adaptive filter to minimize an error signal based on determining a frequency response of the device 102 (e.g., by comparing frequency components of the feedback signal 226 to the audio playback signal 232)

and comparing the frequency response to a target acoustic response. The resulting adjustment signal 152 causes the signal combiner 230 to adjust the audio playback signal 232 to at least partially compensate for a deviation from the target acoustic response.

The pressure effect predictor 110, the pressure effect compensator 120, and the adaptive filtering unit 150 are implemented in one or more processors 202. To illustrate, the signal combiner 230 can be implemented as a digital multiplier within the processor(s) 202. In other implementations, the signal combiner 230 can be implemented as an analog circuit external to the processor(s) 202.

Figure 3:
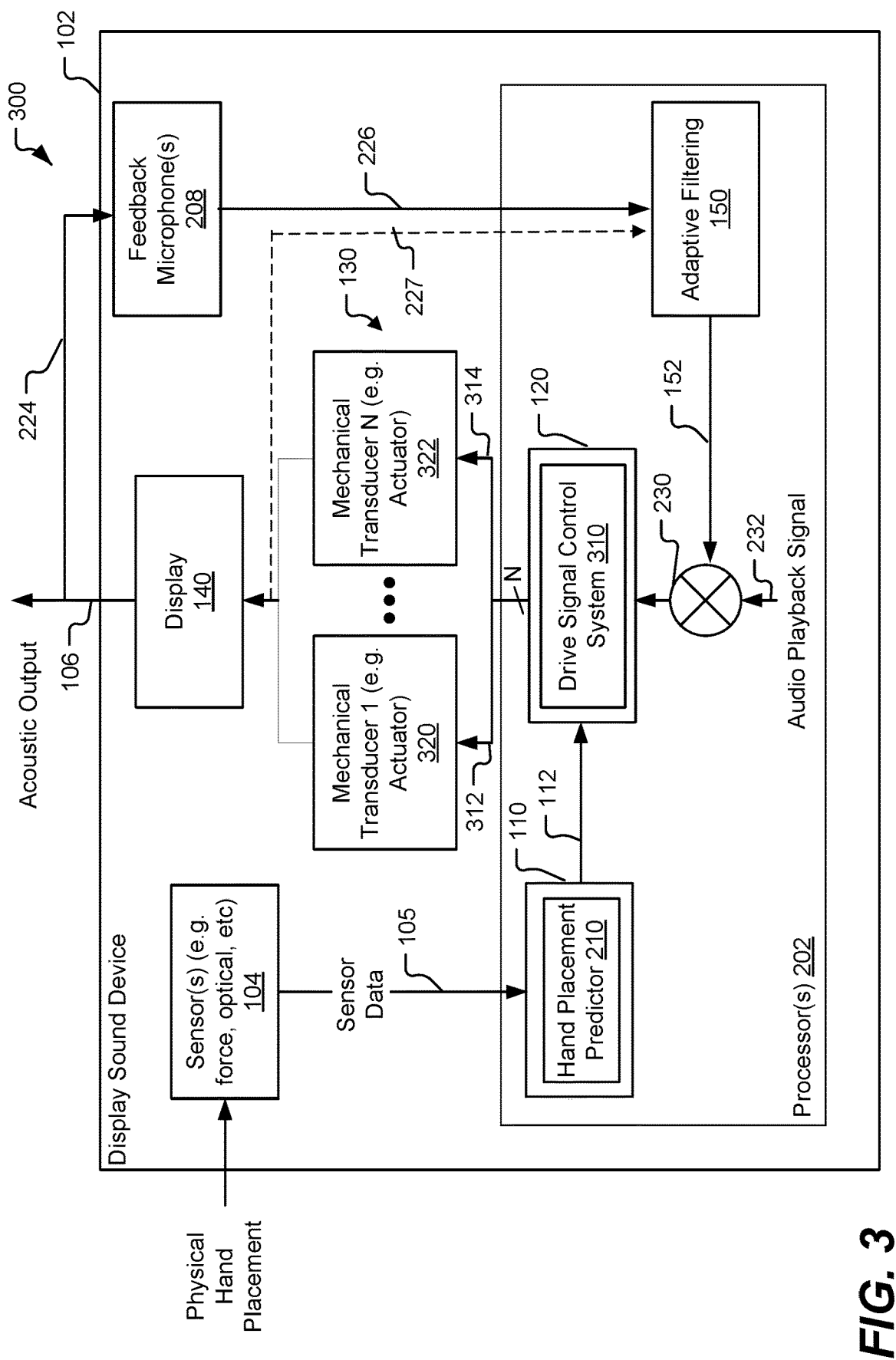
FIG. 3 is a diagram of another particular implementation of the device of FIG. 1.

FIG. 3 depicts a second implementation 300 showing further aspects of components that can be implemented in the device 102. In contrast to FIG. 2, the audio playback component 130 in FIG. 3 includes multiple mechanical transducers 320-322 configured to be coupled to the display 140. Each of the mechanical transducers 320-322 is responsive to a respective drive signal of multiple drive signals to generate at least a portion of the acoustic output 106 by vibrating the display 140. To illustrate, the audio playback component 130 includes N mechanical transducer, where N is an integer greater than 1. A first mechanical transducer 320 is responsive to a first drive signal 312, one or more other mechanical transducers are responsive to one or more other drive signals, and an Nth mechanical transducer 322 is responsive to an Nth drive signal 314. The mechanical transducers 320-322 may be spaced apart at various locations along the display 140 to provide greater control over vibration modes and phase effects as compared to using a single mechanical transducer to vibrate the display 140.

The pressure effect compensator 120 includes a drive signal control system 310 that is configured to receive the audio playback signal 232 and to generate the multiple drive signals 312-314 based on the audio playback signal 232 and the output data 112. For example, the signal combiner 230 can receive an adjusted audio playback signal from the signal combiner 230 based on the audio playback signal 232 and the adjustment signal 152 from the adaptive filtering unit 150.

Although FIGS. 1-3 describe use of the adaptive filtering unit 150 in conjunction with a feedback signal from one or more feedback microphones, in other implementations the adaptive filtering unit 150 receives a feedback signal from one or more other sources instead of, or in addition to, from a feedback microphone. In an illustrative example, the adaptive filtering unit 150 is configured to receive the feedback signal from an output of a mechanical transducer of the audio playback component 130, illustrated in FIG. 3 as a feedback signal 227. The feedback signal 227 enables the adaptive filtering unit 150 to directly use actuator output for adaptive filtering, such as for correcting for effects of hand placement on the mechanical vibration of the actuator. In other implementations, a feedback signal can be generated by activating one or more of the transducers 320-322 and using one or more un-activated transducer 320-322 as a microphone to generate the feedback signal.

In some implementations, the adaptive filtering unit 150 can use an error signal to update the adaptive filter that is based on changes to an acoustic input from a feedback microphone, or transducer change, or drive signal control system change, or hand placement prediction change.

Although FIGS. 1-3 depict implementations in which the adjustment signal 152 is generated by the adaptive filtering unit 150, in other implementations the adjustment signal 152 is not generated or used to adjust the audio playback signal 232. For example, in configurations in which the additional correction that would be provided by the adaptive filtering unit 150 is relatively small compared to the correction provided by the pressure effect predictor 110 and pressure effect compensator 120, the adaptive filtering unit 150 may be omitted. In other implementations, the adaptive filtering unit 150 may be selectively activated or deactivated, such as based on a magnitude of the adjustment signal 152. For example, a measure of the adjustment signal 152 below a threshold can indicate a condition in which the pressure effect predictor 110 and pressure effect compensator 120 provide sufficient compensation for pressure effects and that the adaptive filtering unit 150 can be deactivated.

In some implementations, values of parameters, such as filter parameters, look-up table data, and classifier models used by the device 102 (e.g., in the pressure effect predictor 110 and the pressure effect compensator 120) can be set by a manufacturer or provider of the device 102. In some implementations, the device 102 is configured to adjust one or more such values during the life of the device 102 based on downloading and installing new model(s). In some implementations, the device 102 (e.g., the processor(s) 202) implements machine learning (or artificial intelligence) configured to adjust one or more such values during the life of the device 102 based on detected patterns of applied pressure and the effectiveness of pressure compensation, such as determined by the adaptive filtering unit 150. For example, a history of sensor data for the device 102 can indicate that a relatively small number of distinct pressure configurations are typically used (e.g., holding patterns typically used by a user of the device 102), and the hand placement predictor 210 and pressure effect compensator 120 can be updated to more efficiently detect and compensate for such configurations.

Figure 4:
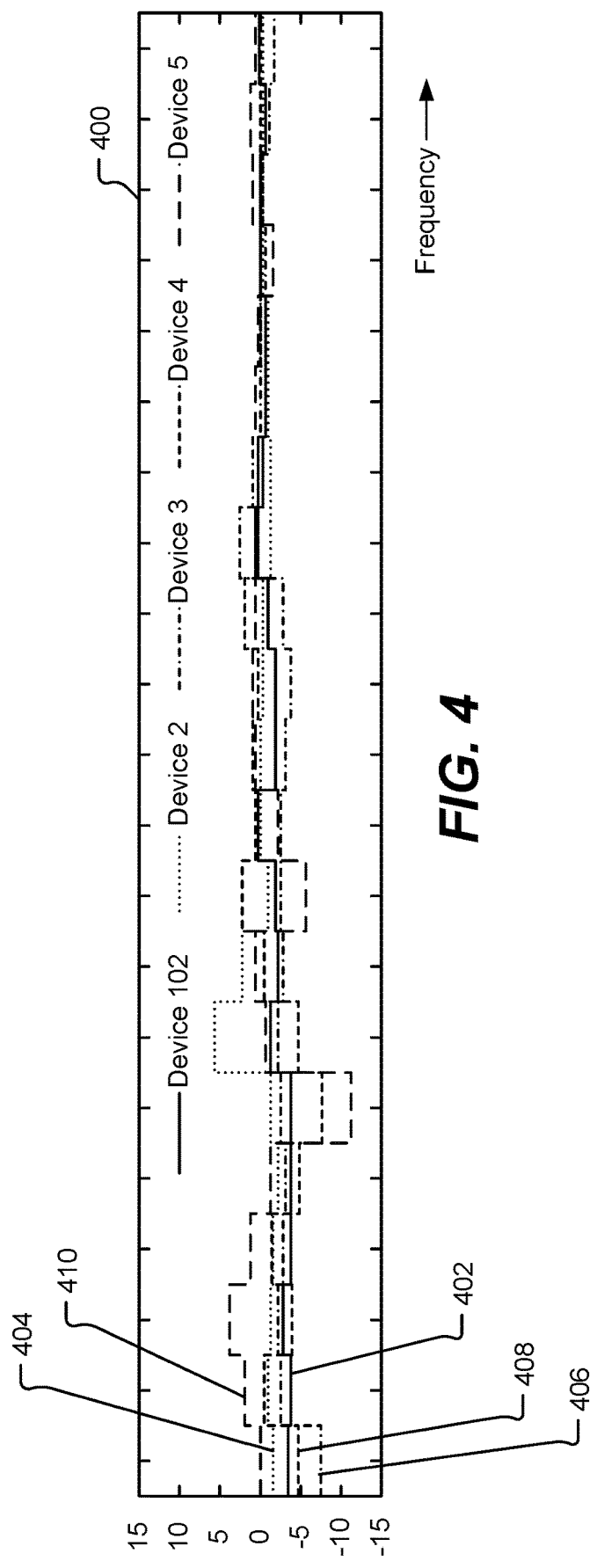
FIG. 4 is a diagram of graph showing changes of frequency responses of multiple display sound devices, including the device of FIG. 1, as support pins are applied to and removed from the backs of the devices.

FIG. 4 depicts a graph 400 that compares examples of a frequency response of the device 102 to frequency responses of conventional display sound devices that do not compensate for pressure effects. The graph 400 has a horizontal axis representing frequency and a vertical axis representing a change of a frequency response, in decibels (dB), of a device due to pressure applied to and removed from a backplate of the device as supporting pins are added/removed from the back of five separate display sound devices (e.g., the device 102 and four conventional devices). A flat response of 0 dB corresponds to no variation due to changes in support pins.

A first trace 402 (represented by a solid line) remains close to a 0 dB value, indicating relatively little to no change in the acoustic response of the device 102, as compared to the changes in frequency responses for four separate devices that do not include adaptive pressure compensation, represented by traces 404, 406, 408, and 410. As illustrated, the traces 404-410 vary significantly from the 0 dB value, such as approximately between +/−5 dB, demonstrating substantial variability due to support pin placement, with larger variations at lower frequencies (the left portion of the graph) as compared to at higher frequencies (the right portion of the graph). The reduced variability demonstrated by the first device 102 as compared to the variability of the other devices illustrates a technical benefit of adaptive pressure compensation techniques described with reference to FIGS. 1-4.

Figure 5:
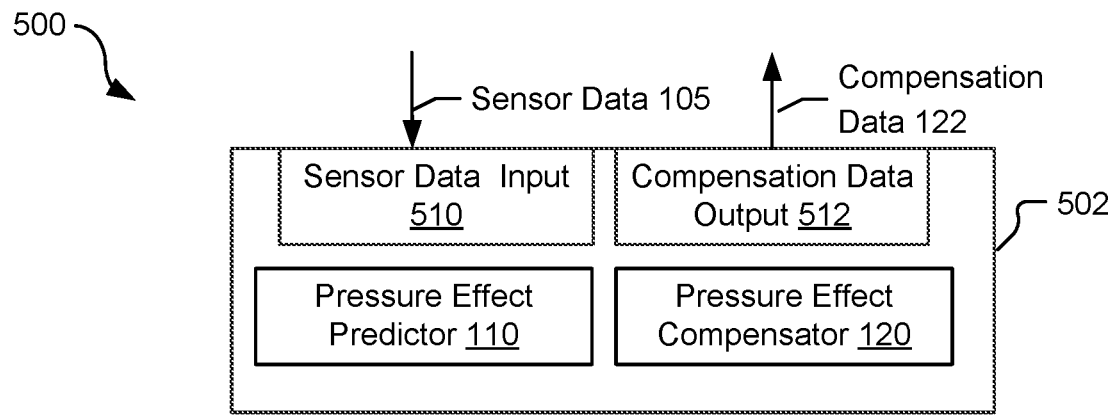
FIG. 5 is a diagram of another implementation of a device operable to determine pressure compensation.
Figure 7:
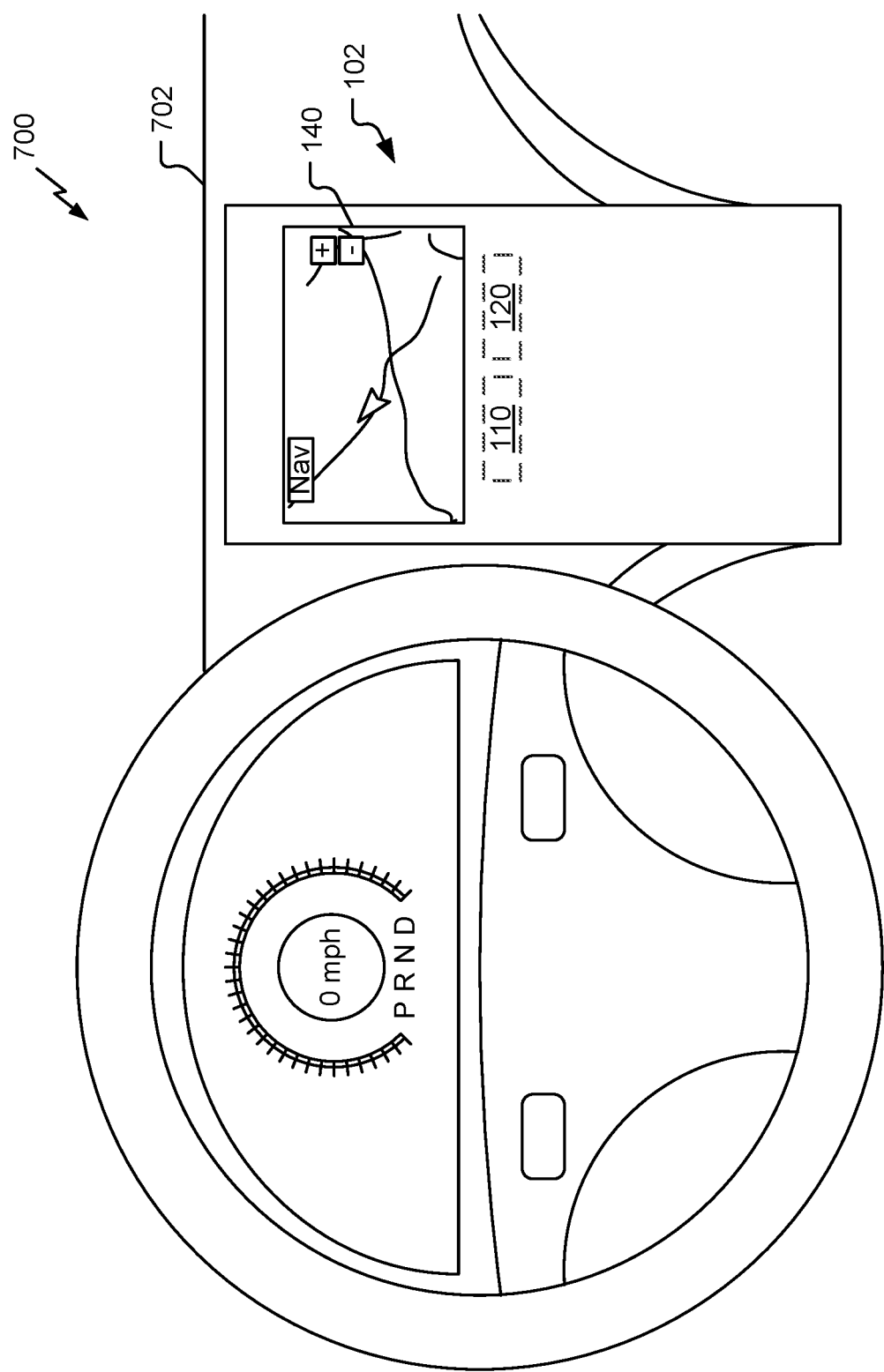
FIG. 7 is a diagram of a vehicle operable to perform pressure compensation for display sound device.
Figure 8A:
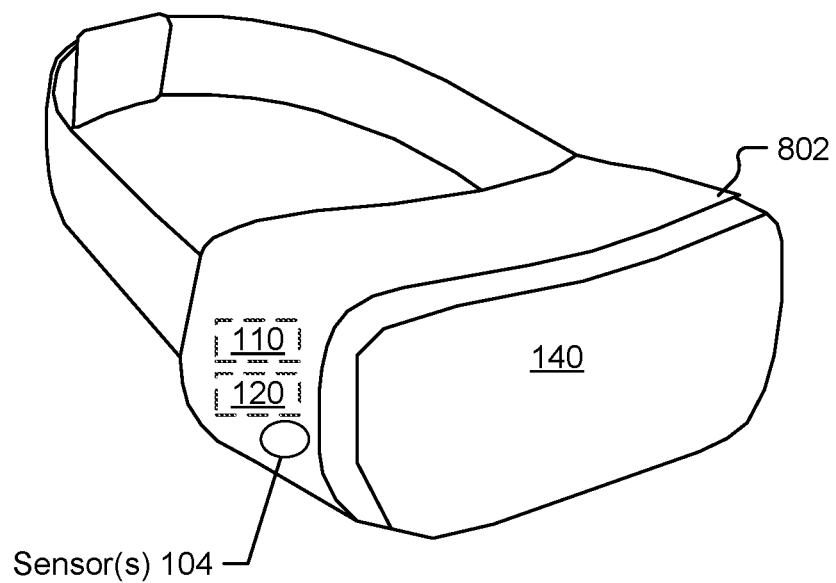
FIG. 8A is a diagram of a virtual reality or augmented reality headset operable to perform pressure compensation.
Figure 8B:
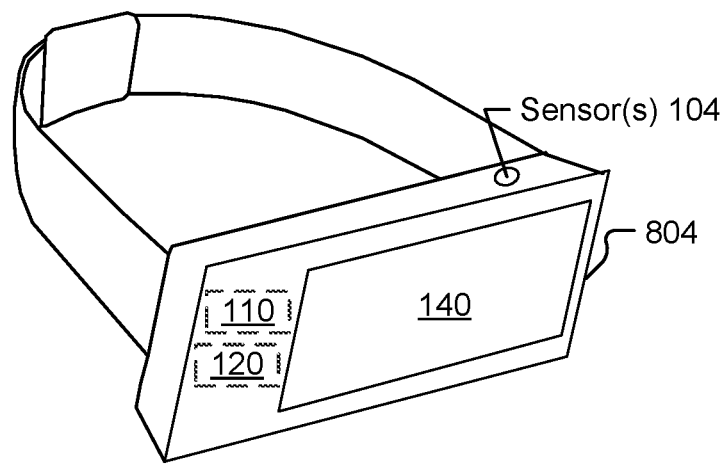
FIG. 8B is a diagram of a wearable electronic device operable to perform pressure compensation.
Figure 9:
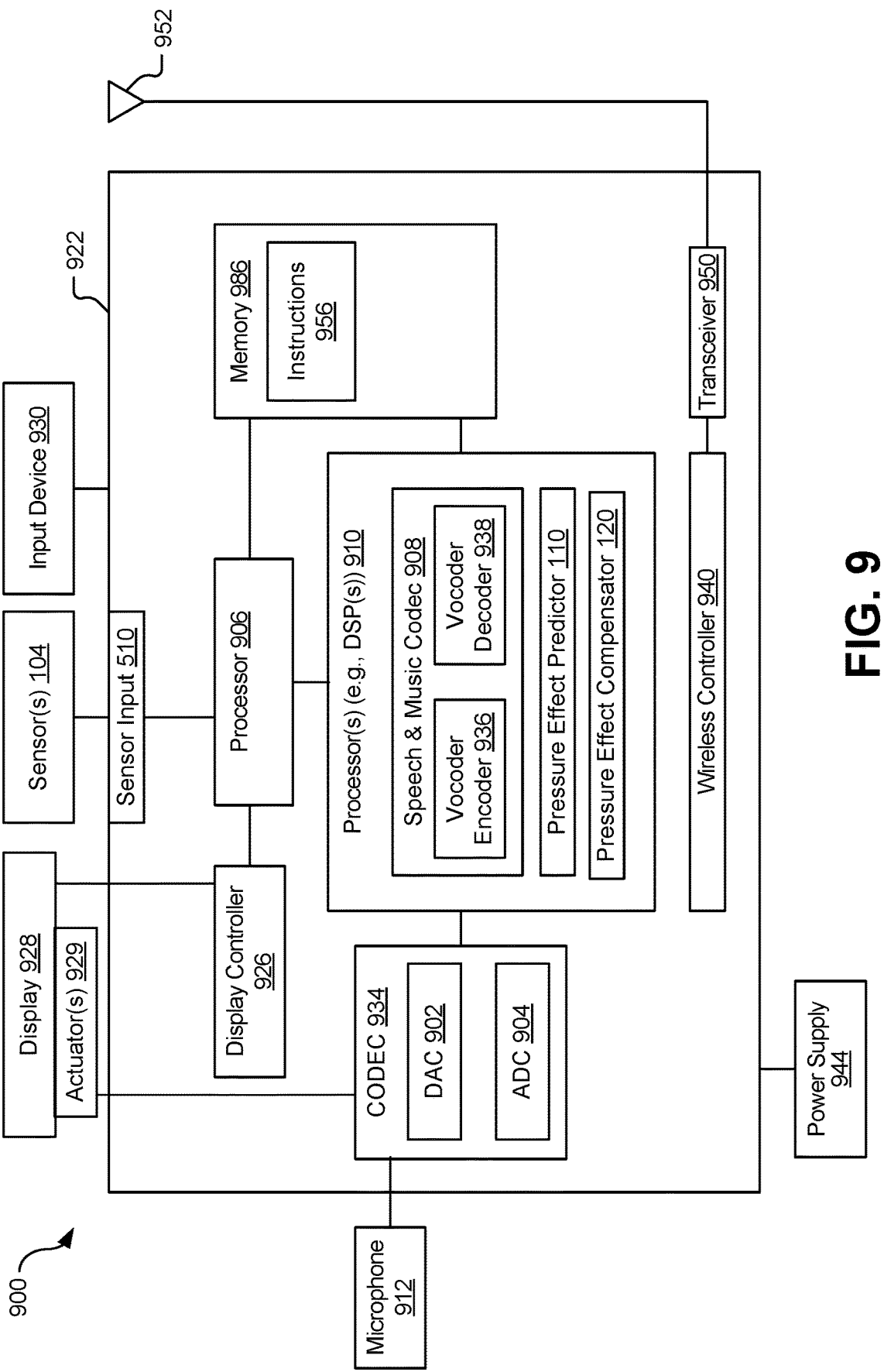
FIG. 9 is a block diagram of a particular illustrative example of a device that is operable to perform pressure compensation.

FIG. 5 depicts an implementation 500 of a device 502 that includes the pressure effect predictor 110 and the pressure effect compensator 120 integrated in a discrete component, such as a semiconductor chip or package as described further with reference to FIG. 9. The device 502 includes a sensor signal input 510, such as a first bus interface, to enable the sensor data 105 to be received from one or more sensors external to the device 502. The device 502 also includes a compensation data output 512, such as a second bus interface, to enable sending of the compensator output 122 (e.g., as the drive signal 234 or the drive signals 312-314). The device 502 enables implementation of pressure effect compensation as a component in a system that includes one or more pressure sensors, a mechanical transducer, and a display, such as in a vehicle as depicted in FIG. 7, a virtual reality or augmented reality headset as depicted in FIG. 8A, a wearable electronic device as depicted in FIG. 8B, or a wireless communication device as depicted in FIG. 9.

Figure 6:
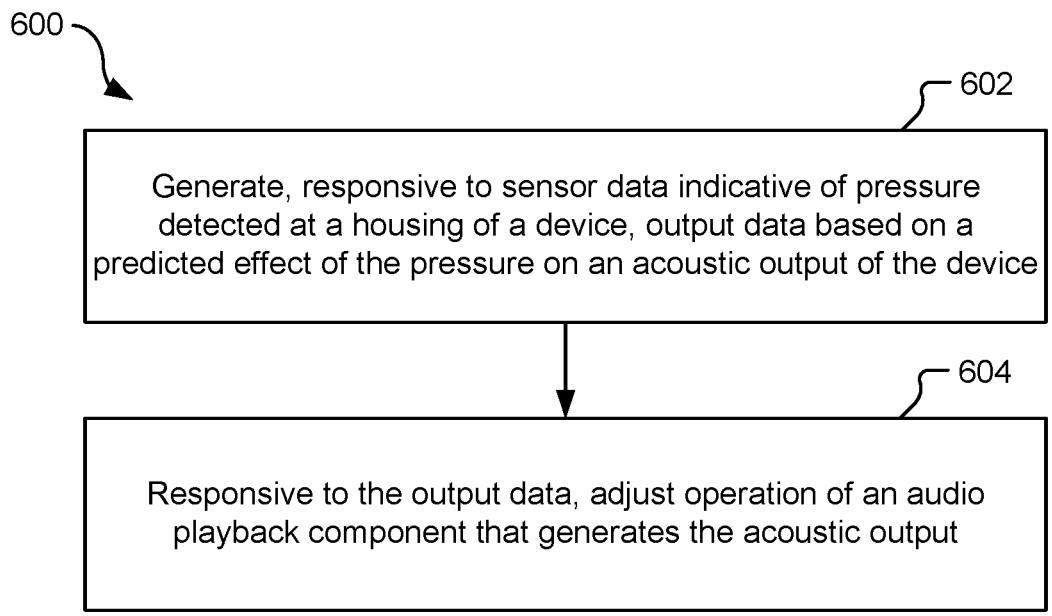
FIG. 6 is a diagram of an implementation of a method of performing pressure compensation that may be performed by the device of FIG. 1.

Referring to FIG. 6, a particular implementation of a method 600 of processing an audio signal representing output sound is depicted that may be performed by the device 102 or the device 502 as an illustrative, non-limiting examples. The method 600 includes generating, responsive to sensor data indicative of pressure detected at a housing of a device, output data based on a predicted effect of the pressure on an acoustic output of the device, at 602. For example, the output data 112 is generated by the pressure effect predictor 110 responsive to the sensor data 105.

The method 600 includes, responsive to the output data, adjusting operation of an audio playback component that generates the acoustic output, at 604. For example, the pressure effect compensator 120 generates the compensator output 122 that affects operation at the audio playback component 130. In some implementations, operation of the audio playback component is adjusted based on equalization filtering, such as described with reference to FIG. 2, or based on adjusting transducer drive control signals, such as described with reference to FIG. 3.

In some implementations, the method 600 also includes receiving a feedback signal at an adaptive filtering unit, such as the feedback signal 226 received at the adaptive filtering unit 150, and generating an adjustment signal to further adjust operation of the audio playback component, such as the adjustment signal 152. The feedback signal may be received from one or more feedback microphones, such as the feedback microphone(s) 208. In some implementations, the feedback signal is received from an output of a mechanical transducer of the audio playback component, such as the feedback signal 227 illustrated in FIG. 3.

In some implementations, adjusting operation of the audio playback component includes generating a compensation signal (e.g., the compensation signal 222) based on the output data, adjusting an audio playback signal (e.g., the audio playback signal 232) based on the compensation signal to generate an adjusted audio playback signal, and sending the adjusted audio playback signal to a transducer (e.g., the transducer 206) to generate at least a portion of the acoustic output by vibrating a display. In some implementations, adjusting operation of the audio playback component includes generating multiple drive signals (e.g., the drive signals 312-314) based on an audio playback signal (e.g., the audio playback signal 232) and the output data and sending, to each transducer of multiple transducers (e.g., the transducers 320-322), a respective drive signal of multiple drive signals to generate at least a portion of the acoustic output by vibrating a display.

The method 600 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 600 may be performed by a processor that executes instructions, such as described with reference to FIG. 9.

FIG. 7 depicts an example of an implementation 700 of the pressure effect predictor 110 and the pressure effect compensator 120 integrated into a vehicle dashboard device, such as a car dashboard device 702. A visual interface device, such as the display 140, is mounted or positioned (e.g., removably fastened to a vehicle handset mount) within the car dashboard device 702 to be visible to a driver of the car. The pressure effect predictor 110 and the pressure effect compensator 120 as illustrated with dashed borders to indicate that the pressure effect predictor 110 and the pressure effect compensator 120 are not visible to occupants of the vehicle. The pressure effect predictor 110 and the pressure effect compensator 120 may be implemented in a device that also includes the display 140 and the sensor(s) 104, such as in the device 102 of FIGS. 1-3, or may be separate from and coupled to the display 140 and the sensor(s) 104, such as in the device 502 of FIG. 5.

FIG. 8A depicts an example of the pressure effect predictor 110 and the pressure effect compensator 120 integrated into a headset 802, such as a virtual reality or augmented reality headset. The display 140 is positioned in front of the user's eyes to enable display of augmented reality or virtual reality images or scenes to the user while the headset 802 is worn, and the sensor(s) 104 are positioned to detect an amount and distribution of pressure, such as from contact with the user's face and head when worn, or contact with the user's hand (e.g., to press one or more external controls of on a housing of the headset 802).

FIG. 8B depicts an example of the pressure effect predictor 110 and the pressure effect compensator 120 integrated into a wearable electronic device 804, illustrated as a "smart watch," that includes the display 140 and sensor(s) 104. The sensor(s) 104 enable detection, for example, of pressure indicative of the position of the wearable electronic device 804 on a user's wrist and a tightness of a band around the user's wrist.

FIG. 9 depicts a block diagram of a particular illustrative implementation of a device 900 that includes the pressure effect predictor 110 and the pressure effect compensator 120, such as in a wireless communication device implementation (e.g., a smartphone). In various implementations, the device 900 may have more or fewer components than illustrated in FIG. 9. In an illustrative implementation, the device 900 may correspond to the device 102. In an illustrative implementation, the device 900 may perform one or more operations described with reference to FIGS. 1-8B.

In a particular implementation, the device 900 includes a processor 906 (e.g., a central processing unit (CPU)). The device 900 may include one or more additional processors 910 (e.g., one or more DSPs). The processors 910 may include a speech and music coder-decoder (CODEC) 908, the pressure effect predictor 110, and the pressure effect compensator 120. The speech and music codec 908 may include a voice coder ("vocoder") encoder 936, a vocoder decoder 938, or both.

The device 900 may include a memory 986 and a CODEC 934. The memory 986 may include instructions 956, that are executable by the one or more additional processors 910 (or the processor 906) to implement the functionality described with reference to the pressure effect predictor 110, the pressure effect compensator 120, or any combination thereof. The device 900 may include a wireless controller 940 coupled, via a transceiver 950, to an antenna 952.

The device 900 may include a display 928 (e.g., the display 140) coupled to a display controller 926 and mechanically coupled to one or more actuators 929, such as the mechanical transducer 206 of FIG. 2 or the mechanical transducers 320-322 of FIG. 3. The actuator(s) 929 and a microphone 912 may be coupled to the CODEC 934. The CODEC 934 may include a digital-to-analog converter 902 and an analog-to-digital converter 904. In a particular implementation, the CODEC 934 may receive analog signals from the microphone 912, convert the analog signals to digital signals using the analog-to-digital converter 904, and provide the digital signals to the speech and music codec 908. The speech and music codec 908 may process the digital signals.

The sensor(s) 104 are coupled to the sensor input 510 to enable sensor data to be operated on by the pressure effect predictor 110. In a particular implementation, the speech and music codec 908 may provide digital signals to the CODEC 934 that represent an audio playback signal that includes compensation based on a predicted effect of pressure on a housing of the device 900, as detected by the sensor(s) 104. The CODEC 934 may convert the digital signals to analog signals using the digital-to-analog converter 902 and may provide the analog signals to the actuator(s) 929 to drive audio output via vibration of the display 928.

In a particular implementation, the device 900 may be included in a system-in-package or system-on-chip device 922. In a particular implementation, the memory 986, the processor 906, the processors 910, the display controller 926, the CODEC 934, and the wireless controller 940 are included in a system-in-package or system-on-chip device 922. In a particular implementation, an input device 930 and a power supply 944 are coupled to the system-on-chip device 922. Moreover, in a particular implementation, as illustrated in FIG. 9, the display 928, the actuator(s) 929, the input device 930, the microphone 912, the antenna 952, and the power supply 944 are external to the system-on-chip device 922. In a particular implementation, each of the display 928, the actuator(s) 929, the input device 930, the microphone 912, the antenna 952, and the power supply 944 may be coupled to a component of the system-on-chip device 922, such as an interface or a controller.

The device 900 may include a mobile communication device, a smart phone, a cellular phone, a laptop computer, a computer, a tablet, a personal digital assistant, a display device, a television, a gaming console, a music player, a radio, a digital video player, a digital video disc (DVD) or Blu-ray disc player, a tuner, a camera, a navigation device, a virtual reality of augmented reality headset, a wearable electronic device, a vehicle console device, or any combination thereof, as illustrative, non-limiting examples.

In conjunction with the described implementations, an apparatus to process an audio signal representing output sound includes means for generating, responsive to sensor data indicative of pressure detected at a housing of a device, output data based on a predicted effect of the pressure on an acoustic output of the device. For example, the means for generating the output data can correspond to the pressure effect predictor 110, the hand placement predictor 210, the processor 202, the device 502, the processor(s) 910, one or more other circuits or components configured to generate, responsive to sensor data indicative of pressure detected at a housing of a device, output data based on a predicted effect of the pressure on an acoustic output of the device, or any combination thereof.

The apparatus also includes means for adjusting operation, responsive to the output data, of an audio playback component that generates the acoustic output. For example, the means for adjusting operation, responsive to the output data, of an audio playback component that generates the acoustic output can correspond to the pressure effect compensator 120, the equalizer adjustor 220, the signal combiner 230, the drive signal control system 310, the processor 202, the device 502, the processor(s) 910, one or more other circuits or components configured to adjust operation, responsive to the output data, of an audio playback component that generates the acoustic output, or any combination thereof.

In some implementations, non-transitory computer-readable medium (e.g., the memory 986) includes instructions (e.g., the instructions 956) that, when executed by one or more processors of a device (e.g., the processor 906, the processor(s) 910, or any combination thereof), cause the one or more processors to perform operations for processing an audio signal representing output sound. The operations include generating, responsive to sensor data indicative of pressure detected at a housing of the device, output data based on a predicted effect of the pressure on an acoustic output of the device. The operations also include, responsive to the output data, causing an adjustment of operation of an audio playback component that generates the acoustic output.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to process an audio signal representing output sound, the device comprising:
one or more processors configured to:
generate, responsive to sensor data indicative of how user-based pressure is applied on a housing of the device, output data based on a predicted effect of the user-based pressure on an acoustic output of the device; and
responsive to the output data, adjust operation of an audio playback component that generates the acoustic output.

2. The device of claim 1, wherein the audio playback component comprises a transducer configured to be coupled to a display, the transducer responsive to a drive signal to generate at least a portion of the acoustic output by vibrating the display.

3. The device of claim 2, wherein the one or more processors are further configured to:
generate a compensation signal based on the output data; and
adjust an audio playback signal based on the compensation signal to generate an adjusted audio playback signal that is output to the transducer.

4. The device of claim 1, wherein the audio playback component comprises multiple transducers configured to be coupled to a display, each of the transducers responsive to a respective drive signal of multiple drive signals to generate at least a portion of the acoustic output by vibrating the display.

5. The device of claim 4, wherein the one or more processors include a drive signal control system configured to receive an audio playback signal and to generate the multiple drive signals based on the audio playback signal and the output data.

6. The device of claim 1, further comprising one or more sensors coupled to the housing and configured to generate the sensor data.

7. The device of claim 1, wherein the one or more processors include an adaptive filtering unit configured to receive a feedback signal and to generate an adjustment signal to further to adjust operation of the audio playback component.

8. The device of claim 7, wherein the adaptive filtering unit is configured to receive the feedback signal from one or more feedback microphones.

9. The device of claim 7, wherein the adaptive filtering unit is configured to generate the adjustment signal based on a measured acoustic response of the device and a target frequency response.

10. The device of claim 7, wherein the adaptive filtering unit is configured to receive the feedback signal from an output of a transducer of the audio playback component.

11. The device of claim 1, further comprising a memory coupled to the one or more processors and wherein the one or more processors are in an integrated circuit.

12. The device of claim 1, wherein the one or more processors are integrated in a portable communication device.

13. The device of claim 1, wherein the one or more processors are integrated in a wearable electronic device.

14. The device of claim 1, wherein the one or more processors are integrated in a vehicle.

15. The device of claim 1, wherein the one or more processors are integrated in a virtual reality or augmented reality headset.

16. A method of processing an audio signal representing output sound, the method comprising:
generating, responsive to sensor data indicative of how user-based pressure is applied on a housing of a device, output data based on a predicted effect of the user-based pressure on an acoustic output of the device; and
responsive to the output data, adjusting operation of an audio playback component that generates the acoustic output.

17. The method of claim 16, wherein adjusting operation of the audio playback component includes:
generating a compensation signal based on the output data;
adjusting an audio playback signal based on the compensation signal to generate an adjusted audio playback signal; and
sending the adjusted audio playback signal to a transducer to generate at least a portion of the acoustic output by vibrating a display.

18. The method of claim 16, wherein adjusting operation of the audio playback component includes:
generating multiple drive signals based on an audio playback signal and the output data; and
sending, to each transducer of multiple transducers, a respective drive signal of multiple drive signals to generate at least a portion of the acoustic output by vibrating a display.

19. The method of claim 16, further comprising receiving a feedback signal at an adaptive filtering unit and generating an adjustment signal to further adjust operation of the audio playback component.

20. The method of claim 19, wherein the feedback signal is received from one or more feedback microphones.

21. The method of claim 19, wherein the adjustment signal is generated based on a measured acoustic response of the device and a target frequency response.

22. The method of claim 19, wherein the feedback signal is received from an output of a transducer of the audio playback component.

23. A non-transitory computer-readable medium comprising instructions that, when executed by one or more processors of a device, cause the one or more processors to:
generate, responsive to sensor data indicative of how user-based pressure is applied on a housing of the device, output data based on a predicted effect of the user-based pressure on an acoustic output of the device; and
responsive to the output data, cause an adjustment of operation of an audio playback component that generates the acoustic output.

24. The non-transitory computer-readable medium of claim 23, wherein the instructions further cause the one or more processors to:
generate a compensation signal based on the output data;
adjust an audio playback signal based on the compensation signal to generate an adjusted audio playback signal; and
send the adjusted audio playback signal to a transducer to generate at least a portion of the acoustic output by vibrating a display.

25. The non-transitory computer-readable medium of claim 23, wherein the instructions further cause the one or more processors to:

generate multiple drive signals based on an audio playback signal and the output data; and send, to each transducer of multiple transducers, a respective drive signal of multiple drive signals to generate at least a portion of the acoustic output by vibrating a display.

26. The non-transitory computer-readable medium of claim 23, wherein the instructions further cause the one or more processors to receive a feedback signal and generate an adjustment signal to further adjust operation of the audio playback component.

27. The non-transitory computer-readable medium of claim 26, wherein the feedback signal is received from one or more feedback microphones.

28. The non-transitory computer-readable medium of claim 26, wherein the adjustment signal is generated based on a measured acoustic response of the device and a target frequency response.

29. An apparatus to process an audio signal representing output sound, the apparatus comprising:

means for generating, responsive to sensor data indicative of how user-based pressure is applied on a housing of a device, output data based on a predicted effect of the user-based pressure on an acoustic output of the device; and means for adjusting operation, responsive to the output data, of an audio playback component that generates the acoustic output.

30. The apparatus of claim 29, further comprising means for generating at least a portion of the acoustic output by vibrating a display.

* * * * *